United States Patent [19]

Grand

[11] Patent Number: 4,823,310
[45] Date of Patent: Apr. 18, 1989

[54] DEVICE FOR ENABLING CONCURRENT ACCESS OF INDEXED SEQUENTIAL DATA FILES

[75] Inventor: Arthur Grand, Nashua, N.H.

[73] Assignee: Wang Laboratories, Inc., Lowell, Mass.

[21] Appl. No.: 84,253

[22] Filed: Aug. 10, 1987

[51] Int. Cl.$^4$ .......................... G06F 7/00; G06F 7/08
[52] U.S. Cl. .................... 364/900; 364/960; 364/960.5
[58] Field of Search ... 364/200 MS File, 900 MS File, 364/300

[56] References Cited

U.S. PATENT DOCUMENTS

| | | | |
|---|---|---|---|
| 4,030,078 | 6/1977 | Klüge | 364/900 |
| 4,599,691 | 7/1986 | Sakaki et al. | 364/900 |
| 4,611,298 | 9/1986 | Schuldt | 364/900 |
| 4,627,019 | 12/1986 | Ng | 364/900 |

*Primary Examiner*—Gareth D. Shaw
*Assistant Examiner*—Joseph T. Fitzgerald
*Attorney, Agent, or Firm*—Michael H. Shanahan; Gordon E. Nelson

[57] ABSTRACT

An indexed sequential file is made accessible for random or sequential reading of records while allowing concurrent modification to the file. Each ordered group of records in the file is associated with timestamps referencing a deletion time of the group and the time that the group was last modified. During a current search in a group for a desired record, the timestamp referencing a deletion time of the group is compared to a search time established at the beginning of the search. For a sequential reading the timestamp referencing a last modification time of a group containing the desired record is compared to a respective timestamp corresponding to the reading of the preceeding record. The comparisons provide indications of whether the group to which the desired record belongs is currently the group to be searched. The most recently modified and deleted groups are stored in a cache memory. When the cache memory is full, an incoming group and respective timestamps replaces the least recent or least likely to be used group and respective timestamps. The most recent timestamps of replaced groups' timestamps are saved in local memory and are used in the comparisons for groups not currently in the cache.

41 Claims, 4 Drawing Sheets

DEVICE FOR ENABLING CONCURRENT ACCESS OF INDEXED SEQUENTIAL DATA FILES

BACKGROUND OF THE INVENTION

In order to manage a large collection of data elements, it is common to organize the data elements in some hierarchical order or sequence. With such organization, each data element has a unique location in the sequence and becomes more readily accessible. Further, a sequential reading of all the elements is made possible.

In the case of an indexed sequential file system or an indexed sequential access method (ISAM), a large collection of records is organized in "key number" order. That is, each record is associated with a unique key number and the key numbers are arranged in ascending order. Hence, each record may be retrieved either by individual key number or sequentially (i.e. in order of ascending key number). The key numbers and records are considered to be elements of the file.

Indexed sequential files are usually implemented in a computer or software system using a data structure known as a B tree. In general, a B tree comprises a set of vertices called nodes connected by a set of branches called pointers. Each node holds a unique set of ordered key numbers. The nodes are arranged in an order themselves. In order to read or search the B tree, one sequentially traverses the tree from node to node via the pointers. One node is designated as "root", and the B-tree is said to be "oriented" such that a unique path of pointers leads from the root to each of the remaining nodes. A node which is pointed to by a pointer from another node is considered to be a descendant node. A node with no descendants is called a "leaf node".

Each leaf node contains N key numbers (keys) sorted in ascendancy order together with N associating data values or records of the indexed sequential file.

Each non-leaf node contains a series of N key numbers (keys) or elements sorted in ascending order plus N associated pointers. The pointer associated with the Ith key points to a subtree which contains all nodes whose elements are greater than or equal to the I-th key and less than the I+1 key.

Each node in the tree (with the exception of the root) is at least half full.

A user is able to operate on a B-tree in the following three ways.

Search Operation

The user may search for a leaf node entry in the B-tree (i.e. a record of the file) given its key number or the immediately preceeding key. In a search operation, the computer system descends the B-tree starting with the root node until the proper leaf node is reached.

Insertion Operation

The user may insert an entry (i.e. a record) in a leaf node. In an insertion operation, the computer system performs a search to find the proper leaf in which to insert the new entry. The system then determines whether the leaf contains enough unused space to fit the new entry. If so then the entry is inserted; otherwise the leaf is split into two leaf nodes (i.e. an "original" node and a new node) and the new entry is inserted in the appropriate node. The parent node of the original leaf node is then located, and the smallest key in the new leaf node and a pointer to that smallest key is inserted into the parent node. If the parent node is already full then the parent is split into two nodes and the scheme is applied recursively. If the root is split then the height of the tree is increased and a new root is created.

Deletion Operation

A user may delete an entry (i.e. record) from a leaf node. In a deletion operation the B-tree is searched to find the subject leaf node and the entry record is removed. If the leave node becomes less than half full, then the leaf node is combined with the next successive leaf node. The parent of the next successive leaf node is located and a scheme is recursively applied to remove the key number and pointer associated with the next successive leaf node held by the parent node.

Most ISAM systems implement sequential reads by saving the key of the last retrieved record in main memory. Each time a program issues a sequential read request, the ISAM system performs a search operation to find the record whose key is immediately greater than the key of the last retrieved record.

The cost of such a search operation is based on two factors: the cost of reading nodes from disk (i/o cost) and the cost of examining each node (CPU cost). The i/o cost of sequential reads is generally optimized by keeping copies of the most recently accessed nodes in a cache located in main memory. Each time a node is needed, the cache is examined; the node is read from disk if it is not in the cache. Caching eliminates most of the i/o cost for sequential reads. However, the CPU cost can be considerable, particularly for applications which spend most of their time doing sequential reads.

Some ISAM systems optimize sequential reads by keeping an extra "link" pointer in each node which points to the next node in the tree. Such linked ISAM files are implemented by modified B-tree data structures known as "Linked B-trees". Linked B-trees allow for a considerably more efficient implementation of sequential reads.

Each time the system performs a read of a record in a linked B-tree, it saves the disk address of the node containing the record and the position of the record in the node. Sequential reads are performed by reading the appropriate node from disk using the saved disk address and comparing the saved position with the number of records in the node. If the saved position is less than the number of records in the node then the position is incremented and the corresponding record is retrieved. Otherwise, the position is set to zero, the saved disk address is set to the disk address provided by the node's link pointer, and the process is repeated.

A combination of links and caching can eliminated almost the entire cost of next-read operations in the sequential read. However, the use of links for sequential read causes problems in concurrent environments where one process is allowed to read the ISAM file, while other processes are performing insertions and deletions. Insertions and deletions may cause B-trees to be rearranged so that the "next" record is no longer in the expected node. As a result, links are generally not used in environments which allow concurrent reads and updates. Instead, sequential reads are performed by the more expensive technique of searching the file for the record whose key is immediately greater than the key of the most recently retrieved record.

On the other hand, there exist concurrency control algorithms to prevent processes from interfering with each other. For example, there are concurrency algorithms which prevent process A from examining a node while process B is splitting that node to form a new node. Most concurrency algorithms associate with each B-tree node a feature called a "lock". Processes are required to lock each node before examining it. If the node is already locked, processes seeking to examine the node are suspended until the lock becomes available, that is until the node is unlocked.

In one of the first developed concurrency algorithms, the search operation locked the root node and selected the proper descendant node. It then locked the descendant node and continued the search. The insertion and deletion operations performed a search to locate the proper leaf node. At the end of the search, all the nodes which must potentially be split/combined are already locked, so the insertion of deletion was able to proceed.

The algorithm is inefficient since every tree operation locks the root and concurrency is non-existent. An improvement of the algorithm is as follows. The search operation locks the root node and selects the proper descendant node. It then locks the descendant node, unlocks the root, and continues the search. The insertion and deletion operations perform a search, thus leaving the leaf node locked. They then update the leaf node and determine whether the parent node needs to be updated. If so they lock the parent node and continue.

This "improved" algorithm leads to deadlocks, that is, situations where process A has locked a parent node and is trying to lock a descendant node while process B has locked that descendant node and is trying to lock the parent to update it. Both processes will wait forever.

Philip L. Lehman and S. Bing Yao present variations of the above algorithms in "Efficient Locking for Concurrent Operations on B-trees", *ACM Transactions on Database Systems*, Vol. 6, No. 4, December 1981. Generally in a Lehman-Yao concurrency alqorithm, the search operation looks the root node and selects the proper descendant leaf node. It then unlocks the root node and locks the descendant leaf node. By this time the descendant leaf node may have been split to form a new leaf node and the desired entry or record may actually be in the new leaf node. The search algorithm checks for this by determining whether the desired key is greater than the largest key in the descendant leaf node. If so, the search algorithm locates the new leaf node using the associated link pointer created during the split and determines whether the desired key is greater than or equal to a separator key in the new leaf node. If so, the descendant leaf node is unlocked and the search continues with the new leaf node.

The insertion operation in the Lehman-Yao algorithm performs a search, thus leaving the descendant leaf node locked. The insertion operation then determines whether the descendant leaf node contains room for the new entry record. If so, then the descendant leaf node is updated and unlocked. Otherwise, the insertion operation locates and locks the parent node, splits the descendant leaf node to form a new leaf node, unlocks the descendant and new leaf nodes, and applies the insertion algorithm recursively to the parent node which is now locked.

The deletion operation in the Lehman-Yao concurrency algorithm performs a search and removes the desired entry but does not attempt to combine nodes.

The Lehman-Yao algorithms have, however, two disadvantages. First, the algorithms do not allow the deletion operation to combine nodes when B-tree entries are deleted. Hence, the corresponding disk blocks of memory can not be recycled for future use. Second, the algorithms require the search operation to store a separator key equal to the smallest key ever placed in the node. This consumes extra space and reduces efficiency.

SUMMARY OF THE INVENTION

The present invention discloses the use of "update" and "deletion" timestamps to optimize sequential access to indexed sequential (ISAM) files. More specifically, the present invention uses "update timestamps" to allow links to be used for sequential reads in a concurrent environment and uses "deletion timestamps" to avoid problems of concurrency found in prior art. In addition, the deletion timestamps enable the combining of nodes where prior art did not allow such a combination. An "update timestamp" is a monotomically increasing number assigned to a node when it is modified by insertions and or deletions of entries/records. A "deletion timestamp" is a monotomically increasing number assigned to a node when it is split or removed from the B-tree. Both types of timestamps are unique over the period in which the ISAM file is "open" and aid in the reading and concurrent processing of the B-tree.

Each time a process reads a record of the ISAM file B-tree, it saves three identification factors o the record in a user block of local memory. The three identification factors saved are: the disk memory address of the node of that last read record, the position of that last read record within the node, and the key of the last read record. In addition, the process saves in the user block the update timestamp of the node.

Then, when the process performs a sequential read (i.e. a reading of the record succeeding the last read record) at some later time, the process (1) accesses the node and the position of the last read record in the node using the three saved identification factors, (2) locks the node to temporarily prevent it from being concurrently modified, and (3) compares the node's update timestamp at that time with the saved update timestamp for the last read of that node to see if the node has been modified since the last reading. If the timestamps differ, then the node has been changed since the last reading. The node is unlocked and a search operation is performed to find the record whose key is immediately greater than the key of the last record stored in the user block. If the timestamps match, then the position within the node saved in the user block is compared with the number of entries in the node. If the saved position is less than the number of entries, then the position is incremented and the record corresponding to the resulting position is read. Otherwise, the node identified by the link pointer of the concurrent node is locked, and the first record in that new node is read.

After a resulting record is read, the information in the user block is updated and the node is unlocked. The steps are repeated for each succeeding record in the B-tree.

Each time a process begins a search operation, it obtains a search timestamp. Each time the process successfully locks a node, it compares its search timestamp with the deletion timestamp of the node. If the deletion timestamp is greater than the search timestamp, then the node has been split or removed from the tree since the time that the parent node was examined and the pointer to the locked node was obtained. At this point the locked node is unlocked, and the search operation is repeated from the beginning of the file B-tree with a new search timestamp.

The search operation as applied to the random reading of a record is thus as follows. Given the key number of a record, a random record read is performed by first establishing a current search timestamp and locking a node estimated to contain the given key number. The search timestamp is compared with a deletion timestamp associated with the locked node. If the deletion timestamp of the node is sequentially after the search timestamp, then the node is unlocked and the B-tree is retraced to find a more recent estimation of which node contains the given key number. On the other hand, if the deletion timestamp of the node is before the search timestamp, then the node is searched for the given key number. If the key is found in the node, then the associated record is read and the node is unlocked. If the key is larger than the largest key in the locked node, the node provided by the link pointer of the locked node is searched for the key following the above described steps.

In accordance with one aspect of the present invention, a cache memory is used to store a table of the most recently updated nodes along with respective "update timestamps" of the nodes. In addition, the cache memory table holds a list of the most recently assigned deletion timestamps and corresponding nodes. When the table becomes full, the oldest entry is discarded to make room for an incoming entry. Alternatively, the least likely to be used entry is discarded. Two registers in local memory hold the last discarded deletion and update timestamps respectively. In the case of the least likely to be used entry being discarded, the most recent of the discarded deletion and update timestamps respectively are stored in the two local memory registers.

Each process examines the cache table for a subject node before looking to disk memory for the node. If the subject node is listed in the cache table, then the corresponding listed update or deletion timestamp is compared with a saved update timestamp or obtained search timestamp respectively for reading or searching the node respectively as previously described. If the subject node is not listed in the cache table, then the last discarded update and deletion timestamps held in respective registers in local memory are used for the reading and searching respectively of the node.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

It is often desired to maintain and read a list of ordered items, and to preferably read the items in sequence. With the use of state-of-the-art computers, maintaining (i.e., inserting and deleting items) and reading a list with thousands of such ordered items is possible. However, these larger lists present the concerns of optimizing the time it takes to search for successive items during a sequential reading of the list and the concern of minimizing the amount of main memory space used in connection with the list.

Figures 1, 2:
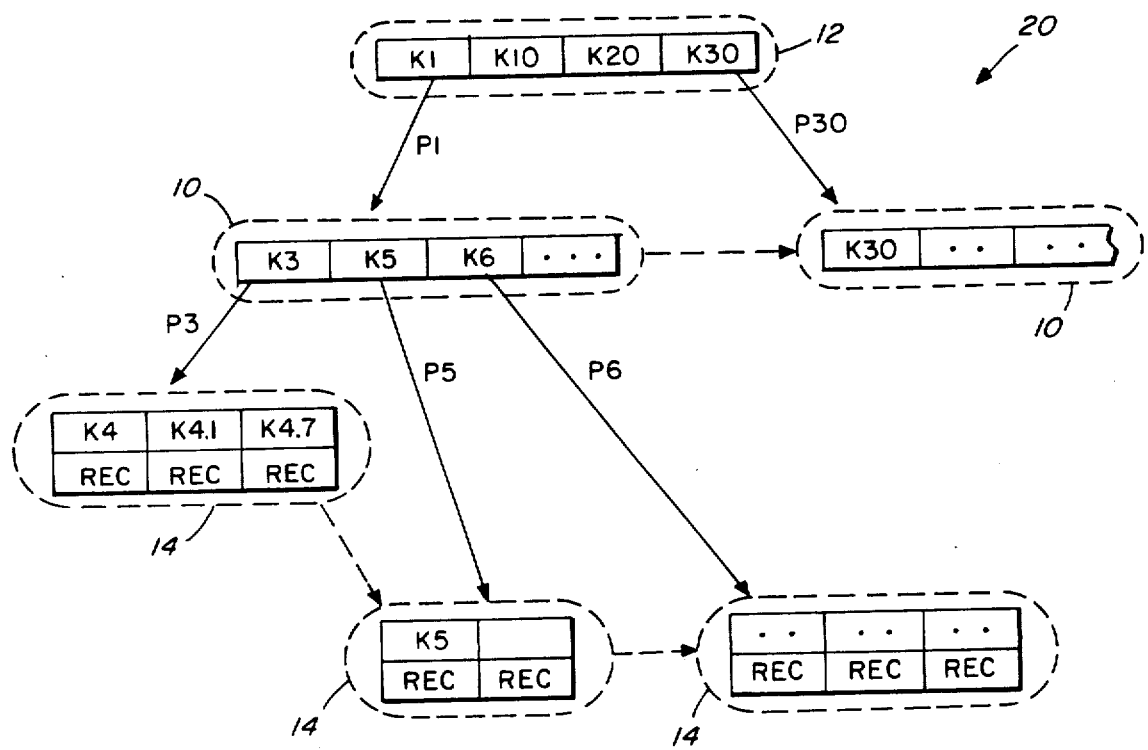
FIG. 1 is a schematic of a linked B-tree employed in the present invention.
FIG. 2 is an illustration of a control table employed in the present invention.

In the present invention, a tree-like data structure is used to organize and manage sequential lists in a manner which addresses the above stated concerns. The tree-like data structure employed by the present invention is known as a "B-tree". FIG. 1 provides an illustration of the use of a B-tree 20 to organize a list of ordered elements called keys and labelled Kn. An ordered subset of the keys form each of the nodes 10, 12, and 14. The node at the top of the tree structure is the root 12 of the tree list 20. The nodes at the bottom of the B-tree 20 are leaf nodes 14. Each key of a leaf node 14 provides an indication of the position in the node and/or the disk memory address of corresponding data values or records, labelled "rec" in FIG. 1. The middle nodes 10 are non-leaf nodes. Each key, Kn, of nodes 10 has an associated pointer, Pn, which provides the disk memory address of a root of a subtree whose nodes have keys greater than or equal to the respective key, Kn, and less than the succeeding key of Kn in node 10. In the illustrated B-tree 20 of FIG. 1, each subtree of the keys of nodes 10 is a leaf node 14.

In addition, nodes 10, 12, and 14 are ordered amongst themselves. Each node 10, 12, 14 has a link pointer, shown as a dashed line arrow, which points to (i.e., provides the disk memory address of) the respective succeeding node. Thus, B-tree 20 is a "linked" B-tree.

Because B-tree 20 allows the data values or records of the list to be read or accessed either sequentially in ascending key order or by respective key number in an arbitrary order, linked B-tree 20 is said to implement an indexed sequential access method (ISAM) or an indexed sequential file.

Further, each node 10, 12, 14 is associated with two tags, one which states the last time the node was modified (i.e. updated) by an insertion or deletion of a key and record, and a second one which states the last time the node was separated into two nodes, deleted, or combined with another node to form one node. These two tags are referred to as "timestamps". Each time a node is updated or deleted (including being split or combined with another node), it is assigned a monotomically increasing "update timestamp" or "deletion timestamp" respectively which is unique over the period of time in which the B-tree/ISAM file 20 is "open". The timestamps may be the date and time of day that the update or deletion occurred or it may be a number generated by a conventional counter.

Upon the updating or deletion of a node the corresponding timestamp is preferably stored, along with a copy of the respective node, in a buffer pool control table 16 in a cache memory, as illustrated in FIG. 2, in order to optimize use of disk memory space. For each recently modified or deleted node, up to a certain limit, the cache memory control table 16 stores: (1) a copy or reference of the accessed node, (2) an update timestamp of the node, and (3) a deletion timestamp of the node. Contained in the copy of each node is a disk memory address of the succeeding node. In a preferred embodiment, the maximum number of node entries in table 16 is user settable up to 2000. Because table 16 is of limited length, only the most recent modifications or deletions are listed. That is, once the cache memory control table 16 is filled, the next entry to the table replaces the existing entry with the least recent timestamp. The timestamps of that discarded entry are saved in registers 42 and 44 for use as later described. For example, a new entry in FIG. 2 would replace the first entry 18. The update and deletion timestamps of the replaced entry 18 are stored in registers 42 and 44 respectively in the cache memory.

Alternatively, a scheme based on probablistic use (i.e. likelihood of use) of a node in control table 16 may be used to determine which entry should be discarded to make room for a new entry. A weighting algorithm, one of the many commonly known, is preferably employed. The existing table entry with the lowest weight is discarded. In the case of two entries having the lowest weight, the entry with the oldest timestamp and lowest weight is discarded. The timestamps of the discarded entry are compared to the respective timestamps saved in registers 42 and 44. The most recent of the respective timestamps are saved in registers 42 and 44.

In a subsequent search for a node, cache memory control table 16 is consulted first. If the node is found in table 16, then the listed corresponding update or deletion timestamp is directly examined. If the node is not found in table 16, then the node is read from disk memory into cache memory control table 16 as an incoming entry. Because the node was not listed in table 16, its update and deletion timestamps are known to be not as recent as those listed in the table 16. Hence, the node assumes the saved timestamps of the last replaced or "discarded" node. For instance, from the previous example, if the replaced Node 12 of the first entry 18 is subsequently the object of a search operation, it is found to no longer exist in cache memory control table 16. Node 12 is therefore read from disk memory into cache memory control table 16 as a new entry and assumes an update timestamp of 100 which is the timestamp of the last replaced timestamp of the cache table 16 as stored in register 42, as shown in FIG. 2. A deletion timestamp is similarly acquired by node 12 from register 44.

Figure 3:
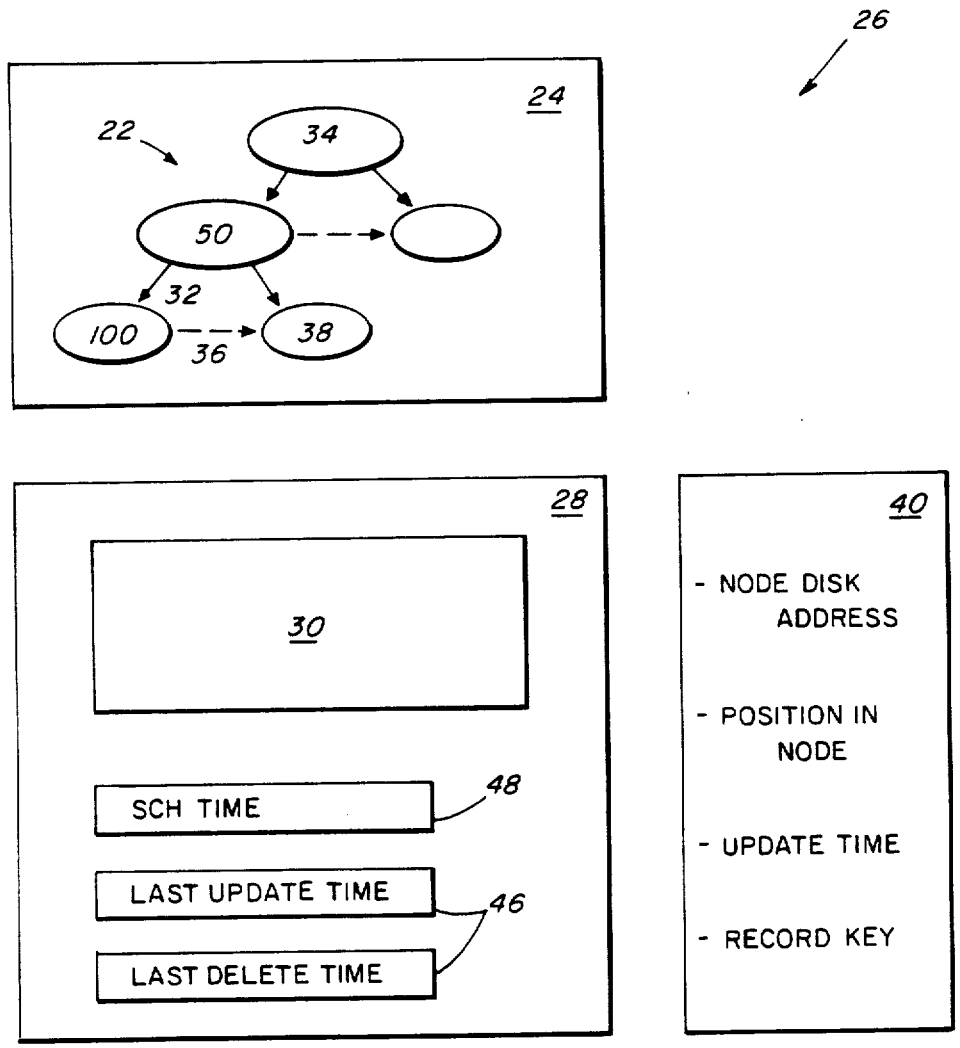
FIG. 3 is a schematic diagram of a system embodying the present invention.

FIG. 3 is a schematic of a system 26 embodying the present invention. The elements of B-tree/ISAM file 22 are stored in disk memory 24. Cache memory 28 contains a control table 30 of the most recently updated or deleted nodes of B-tree 22 and last replaced update and deletion timestamp registers 46 as described in FIG. 2. Each time a record is read from the ISAM file 22, system 26 references its place in the file by saving in user block 40 in local memory: (1) the disk memory address of the node containing the record which was read, (2) the position of the read record within the node, (3) the update timestamp of the node as of the time of the reading of the record, and (4) the key of the record. Meanwhile, each time a record is retrieved and a node is modified, split or deleted, a new update or deletion timestamp, respectively, for that node is reflected in control table 30.

Figure 4:
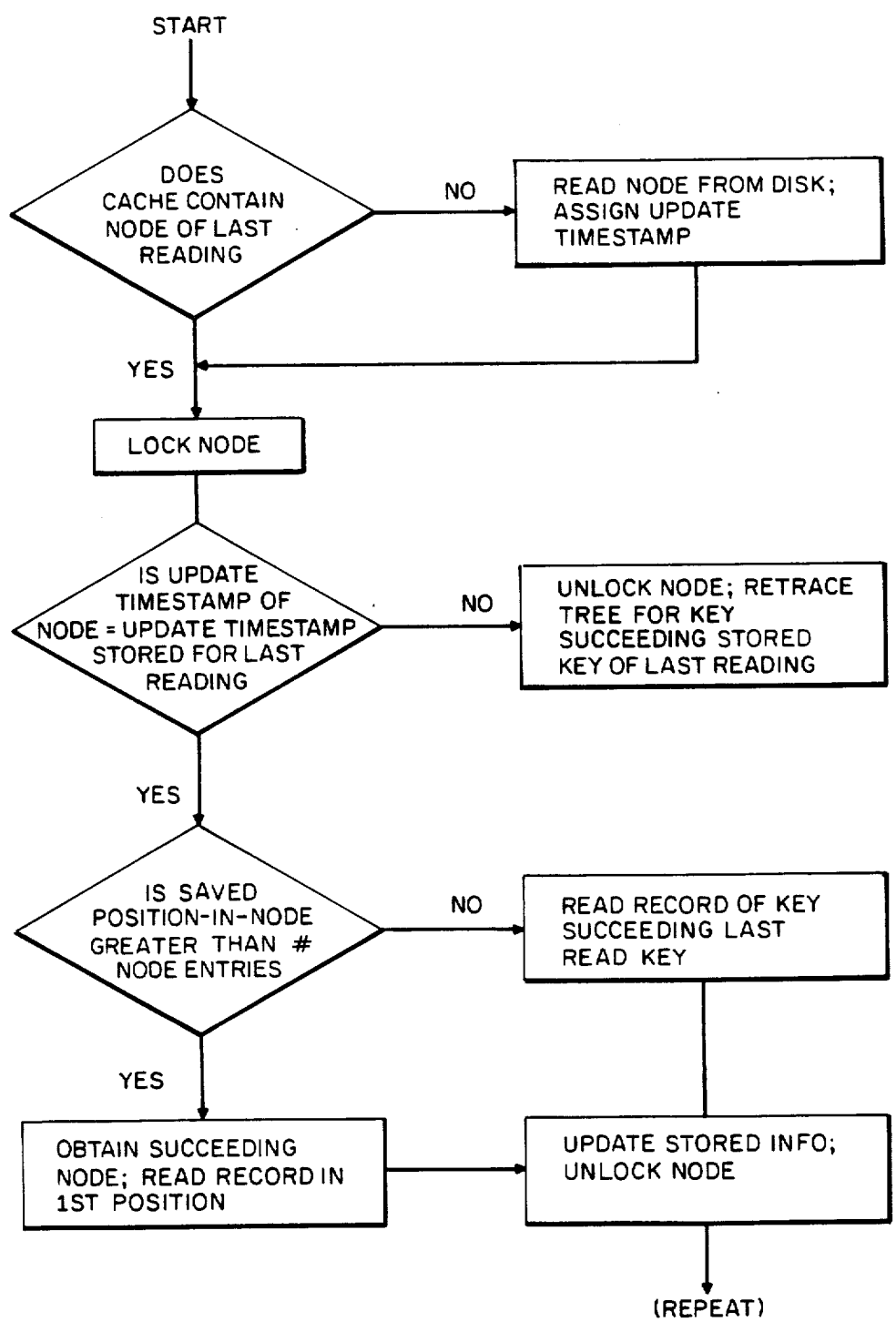
FIG. 4 is a flow chart of a sequential read performed on a linked B-tree by the system of FIG. 3.

With the aid of the information saved in user block 40, system 26 performs a sequential read according to the following steps as outlined in the flow chart of FIG. 4. For purposes of illustration, assume system 26 has just finished reading one record of node 50 of FIG. 3. Given that assumption, the user block 40 thus contains the disk address of that node 50, the last read position in the node, the update timestamp of node 50 as of that last reading, and the key of the record which was read. When the sequential read is continued, system 26 must check for any changes in the B-tree and in particular for any changes to the last read node 50. Hence, system 26 examines control table 30 to see if it currently contains node 50 amongst the listing of the most recently modified or deleted nodes. If not, then node 50 is read into control table 30 from disk at the address stored in user block 40, and node 50 assumes the update and deletion timestamp values of the last replaced/discarded respective timestamps stored in registers 46 as previously described in FIG. 3. Node 50 is locked to temporarily prevent it from being concurrently updated with this reading. The assumed update timestamp of node 50 from register 46 is compared with the update timestamp stored in user block 40. If the timestamps differ then node 50 is unlocked, and system 26 performs a search operation to find the node containing the key immediately greater than the previously saved key number stored in user block 40.

If the timestamps do not differ, then the position within the node as saved in user block 40 is compared with the number of entries in node 50. If the saved position is less than the number of entries, then the position is incremented and the record corresponding to the resulting position is read. Upon reading this record, system 26 stores in user block 40: the disk address of node 50, the resulting position within the node, the current update timestamp of node 50 as of this reading, and the key of the record just read. Node 50 is then unlocked and the foregoing steps are repeated to read in sequential order each record of a node and to read from node to succeeding node.

If the saved position is greater than or equal to the number of entries in node 50, then the node identified by the link pointer of node 50 (node 100 in FIG. 3) is read from disk memory 24 at the address provided by the link pointer entry in table 30. This node is locked and node 50 is unlocked. The first record of the new node (i.e., node 100) is read. Upon this reading, system 26 stores in user block 40: the disk address of the new node, the first position in the new node, the update timestamp assigned to the new node upon being read into the cache control table 30 from disk memory 24, and the key of the record that was just read. The foregoing steps are then repeated to read in sequential order each record of the tree. The steps outlined in the flow chart of FIG. 4 are thus repeated for the reading of each record.

The above scheme for sequentially reading an ISAM file has substantial performance for environments where retrievals are more common than updates since the cost of preparing for updates is limited to the costs of comparing timestamps at the beginning of each sequential read and saving the key at the end of each read. Also, advantages appear directly in CPU cost of sequential reads. Further, the use of locks maximizes the concurrency of reading and updating the B-tree, and the use of a cache memory minimizes the cost of reading and searching from disk memory.

System 26 performs a search operation from a parent node in the following fashion. At the beginning of the search operation, system 26 obtains a search timestamp (i.e. the current date and time of day or a number from a counter). System 26 locks a descendant node and compares its obtained search timestamp with the deletion timestamp of the node as listed in control table 30 if available or assumed from register 46 as previously described. If the deletion timestamp is greater than the search timestamp, then the descendant node has been split or removed from the tree 22 since the time that the parent node was examined and the pointer to the descendant node was obtained. At this point, the descendant node is unlocked and the search operation is repeated with a new search timestamp.

If the deletion timestamp is less than the search timestamp then the descendant node still exists in the tree and can be further searched.

Figure 5:
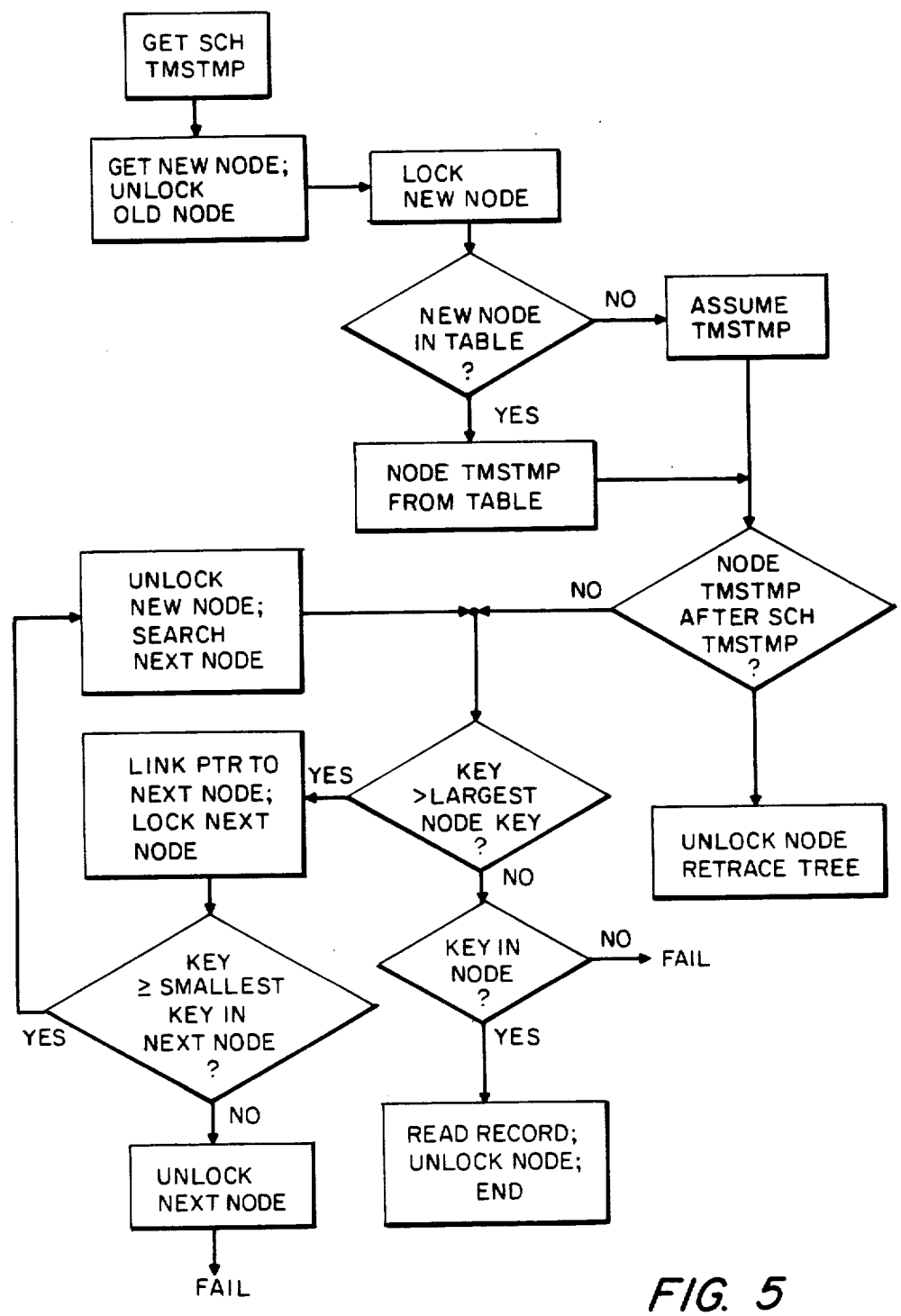
FIG. 5 is a flow chart of a random read performed on a linked B-tree by the system of FIG. 3.

System 26 further utilizes this search operation in performing a random read of a record of tree 22. System 26 performs a random read of a record given the key number of the record according to the steps outlined in the flow chart of FIG. 5. For purposes of this illustration, assume system 26 has just finished searching node 50 of FIG. 3 for the given key number. During that time node 50 was locked to temporarily prevent it from being updated concurrently with the search through node 50. System 26 searches node 50 to produce an estimate of which node is to be the succeeding node to search for the given key number. Pointer 32 from node 50 indicates to system 26 that node 100 contains elements which have succeeding key numbers relative to a key number within node 50. A new search timestamp is stored in a buffer 48 in local memory 28, shown in FIG. 3, to begin a new search in estimated next node 100 for the given key number. Node 50 is unlocked.

Node 100, at the disk memory address provided by associated pointer 32, is locked to temporarily prevent it from being updated concurrently with the searching for the given key number in node 100. System 26 searches control table 30 for node 100. If table 30 contains node 100, then the deletion timestamp listed in the table for node 100 is compared to the search timestamp stored in local memory buffer 48 to see if node 100 has been split or deleted since node 50 was unlocked and this new search began. If the deletion timestamp of node 100 is sequentially after the search timestamp, then node 100 has been split or deleted since this new search began. Thus, the copy of node 100 in table 30 cannot be used to search for the given key number. Node 100 is unlocked and B-tree 22 is retraced from the root node 34 to find the most current descendent nodes of node 50.

If the deletion timestamp of node 100 is chronologically before the search timestamp, then node 100 provided in table 30 is searched for the given key number. Preferably, the given key number is first compared to the largest key in node 100. If the given key number is less than or equal to the largest key in node 100, then system 26 looks for the given key number in node 100. If the key number is found, then the corresponding record is read. Once the corresponding record is read, node 100 is unlocked. If the given key number is not found in node 100, then the search is terminated with an indication to the user of a failure. The position in node 100 of where the given key number would be inserted is also indicated to the user.

If the given key number is larger than the largest key in node 100 then link pointer 36 of node 100 is used to find the succeeding node 38. The validity of this link pointer is assured by the assignment of a deletion timestamp to a node each time it is split as well as deleted. Node 38 is locked. The given key number is compared to the smallest key currently existing in node 38. If the given key number is greater than or equal to the smallest key in node 38, then node 100 is unlocked and node 38 is searched for the given key number in the same manner that node 100 was searched. If the given key number is smaller than the smallest key in node 38, then node 38 is unlocked and the search is terminated in a failure.

If table 30 does not contain node 100, then node 100 is read from disk memory using the disk memory address previously provided by associated pointer 32. A copy of node 100 is read into cache memory table 30. System 26 assigns node 100 a deletion timestamp of the last replaced timestamp stored in register 46 as previously discussed. This deletion timestamp is compared to the search timestamp. If the assigned deletion timestamp is more recent than the search timestamp, then node 100 may have been deleted or split since the beginning of the search. Thus, node 100 may not be the proper succeeding node to be searched at this time. Node 100 is unlocked and a new search is begun (i.e. B-tree 22 is retraced/searched again from root node 34 with a new search time) to find the most current descendent nodes of node 50.

If the assigned deletion timestamp is chronologically before the search timestamp, then node 100 is searched for the given key number as previously described. If the given key number is subsequently found in node 100, then the corresponding record is read. Once the record is read, node 100 is unlocked, and the system 26 saves in control table 30 the copy of node 100. If the given key number is smaller than the largest key in node 100 and is not found in node 100, then the search terminates in a failure and indicates to the user the position in node 100 where the given key would be inserted. If the given key number is greater than the largest key number in node 10, then the succeeding node pointed to by the link pointer 36 of node 100 defines node 38 to be the next node to be searched. Next node 38 is locked and its key numbers are compared to the given key number. If the given key number is greater than or equal to the smallest key number in next node 38, then node 100 is unlocked and node 38 is searched for the given key number in a manner similar to the search in node 100. If the given key number is smaller than the smallest key in node 38, then node 38 is unlocked and the search terminates in a failure.

The deletion timestamps of the foregoing system provide a savings in disk memory space by allowing more than half empty nodes to be merged by the deletion operation and by not requiring every node to carry a separator to indicate the smallest key ever placed in the node.

While the invention has been particularly shown and described with reference to embodiments thereof, it will be understood by those skilled in the art that various changes in form and details may be made therein without departing from the spirit and scope of the invention as defined by the appended claims. For example, deletion and update timestamps, may be associated with other parts of the tree structure such as keys or records instead of the nodes.

I claim:

1. In a computer system for storing a file of data elements, a method of sequentially reading a list of succeeding ordered elements in the file while concurrently allowing the list to be modified, the steps comprising:

providing in a first memory area of the computer system a tree-structure data file for holding a plurality of ordered elements and therewith defining a list, the tree-structure having a plurality of nodes each holding an ordered subgroup of the ordered elements, the nodes linked to each other, in order, by associated pointers;

assigning timestamps to the elements in the tree structure upon providing the tree structure;

reading an element;

recording in a second memory area both an indication of the read element and an indication of the timestamp corresponding to the read element;

updating the timestamp of the read element to a current timestamp each time the node holding the element is modified; and comparing the current timestamp assigned to the read element with the timestamp as indicated by the recorded indication before reading a succeeding element to determine a currently succeeding element of the read element such that modifying the list is enabled while the list is sequentially read.

2. A method as claimed in claim 1 wherein the step of assigning timestamps to the elements in the tree structure includes assigning timestamps to nodes of the tree structure such that each element in a node is assigned the timestamp assigned to that node.

3. A method as claimed in claim 2 wherein the step of assigning timestamps to nodes includes assigning a node the time at which an insertion or deletion of an element of the node occurred.

4. A method as claimed in claim 2 wherein the step of assigning timestamps to nodes includes assigning a node the time at which a splitting or deletion of the node occurred.

5. A method as claimed in claim 1 wherein the step of assigning timestamps includes assigning a succeeding number from a counter.

6. A method as claimed in claim 1 further comprising the step of saving nodes of most recently read elements in a cache memory.

7. A method as claimed in claim 6 wherein the step of saving nodes in a cache memory includes removing nodes from the cache memory when the cache memory is full in order of the node which is least likely to be used and having the least recent timestamp to the node which is most likely to be used.

8. A method as claimed in claim 6 wherein the step of saving nodes in a cache memory includes reading a desired node which is currently absent from the cache memory from a disk memory and assigning it the timestamp which was most recently discarded from the cache memory.

9. A method as claimed in claim 1 wherein the step of comparing the current timestamp includes determining the current timestamp from a cache memory holding the read element and its current timestamp.

10. A method as claimed in claim 9 wherein the step of determining the current timestamp from a cache memory includes assigning a timestamp which was most recently discarded from the cache memory to an element of the tree which is absent from the cache memory.

11. A method as claimed in claim 1 further comprising the step of obtaining a node containing the currently succeeding element using an associated pointer.

12. A method as claimed in claim 11 wherein the step of obtaining the node containing the currently succeeding element includes locking the node so as to temporarily prevent it from being modified.

13. A method as claimed in claim 1 further comprising the steps of:

locking the node holding the read element before comparing its current timestamp with the timestamp indicated by the recorded indication so as to temporarily prevent it from being modified; and unlocking the read element after reading the currently succeeding element.

14. In a computer system storing a data file of elements, a method for sequentially reading a data file having ordered nodes linked by pointers, each node comprising a plurality of ordered elements which are to be read in order within the respective node and from node to node, the steps comprising:

assigning an update timestamp to a node each time the node is modified by a change in elements in the node;

reading an element;

recording in a memory area an indication of the read element and an indication of the update timestamp of the respective node containing the read element, as of the reading of the read element; and before reading a succeeding element, comparing the update timestamp currently assigned to the respective node containing the read element to the update timestamp of the respective node as indicated by the recorded indicating thereof, to determine the currently succeeding element of the read element.

15. A method as claimed in claim 14 further comprising the step of modifying a node by inserting and deleting elements.

16. A method as claimed in claim 14 wherein the step of assigning an update timestamp includes assigning a date and time-of-day to a node.

17. A method as claimed in claim 14 wherein the step of assigning an update timestamp includes assigning a number from a counter.

18. A method as claimed in claim 14 further comprising the step of saving most recently assessed nodes in a cache memory.

19. A method as claimed in claim 18 wherein the step of saving most recently assessed nodes includes removing nodes from the cache memory in order the node with the least recent timestamp to the node with the most recent timestamp when the cache memory is full.

20. A method as claimed in claim 19 wherein the step of saving most recently accessed nodes includes removing nodes from the cache memory in order of the node which is least likely to be used and having the least recent timestamp to the node which is most likely to be used.

21. A method as claimed in claim 19 wherein the step of comparing the update timestamp currently assigned to the respective node includes assuming an update timestamp of a node which was most recently discarded from the cache memory for a node presently absent from the cache memory.

22. A method as claimed in claim 14 wherein the step of comparing the update timestamp currently assigned to the respective node to the update timestamp indicated by the recorded indication includes searching a cache memory holding the respective node and its currently assigned update timestamp.

23. A method as claimed in claim 22 wherein the step of searching includes assuming an update timestamp which was most recently discarded from the cache memory for a currently assigned update timestamp of the respective node when the respective node is found to be absent from the cache memory.

24. A method as claimed in claim 14 further comprising the step of obtaining a node succeeding the respective node containing the read element with the use of an associated pointer to find the succeeding element.

25. A method as claimed in claim 24 wherein the step of obtaining a succeeding node includes locking the succeeding node so as to temporarily prevent it from being modified.

26. A method as claimed in claim 14 further comprising the steps of:
locking the respective node before obtaining its currently assigned update timestamp so as to temporarily prevent it from being modified; and
unlocking the respective node after reading the succeeding element.

27. In a computer system storing data files of ordered elements, apparatus for sequentially accessing and reading ordered elements of a data file while allowing the data file to be modified comprising:
a first means for storing the data file in the form of a tree structure having ordered nodes, each node containing a subgroup of the ordered elements which are to be read in order within the respective node and from node to node;
a second means for assigning a current timestamp to a node each time the node is modified or deleted by a respective operation;
a third means for recording an indication of an element upon the element being read and for recording an indicating of the timestamp corresponding to the node containing the element at a time of the reading of thee element; and
comparison means for comparing the timestamp of the node as indicated by the recorded indication thereof to a current timestamp which is presently assigned to the node, the comparison means performing the comparing just prior to reading a succeeding element of the read element, and the comparison means providing a search for a node currently containing the succeeding element if the current timestamp is different than the timestamp indicated by the recorded indication, and providing the succeeding element from the node containing the read element if the timestamp indicated by the recorded indication is equal to the current timestamp.

28. Apparatus as claimed in claim 27 wherein a node is considered to be modified by an insertion or deletion of an element, and considered to be deleted by a splitting of the node elements into two nodes or deleting all the elements of the node.

29. Apparatus as claimed in claim 27 wherein the second means include a cache memory for storing nodes which have most recently been modified and nodes which have most recently been deleted and corresponding current timestamps.

30. Apparatus as claimed in claim 29 wherein the comparison means compares a timestamp which was last discarded from the cache memory to the timestamp indicated by the recorded indication when the node is currently absent from the cache memory.

31. Apparatus as claimed in claim 29 wherein the comparison means compares a replaced timestamp in the cache memory for the current timestamp of a node when the node is currently absent from the cache memory.

32. Apparatus as claimed in claim 27 wherein the ordered nodes of the first means are linked in sequence by associated pointers, each pointer providing a location in the first means of a succeeding node to the associated node.

33. Apparatus as claimed in claim 27 further comprising node locking means for temporarily preventing a node from being modified during the time in which the comparison means compares the current timestamp and the timestamp indicated by the recorded indication and the succeeding element is read.

34. Apparatus as claimed in claim 27 further comprising search means for searching for a node currently containing the succeeding element, the search means determining a node currently containing the succeeding element by comparing a deletion timestamp of the node with a search timestamp established for the search.

35. Apparatus as claimed in claim 27 wherein deletion timestamps of nodes assigned by said second means enable the combining of nodes by a deletion operation.

36. In a computer system storing data filed of ordered elements, a method of searching for a given element in a data file of ordered elements while concurrently allowing the data file to be modified, the steps comprising:
arranging the data file into a tree like structure having a plurality of nodes, each node containing an ordered subgroup of the ordered elements, the nodes linked to each other in order by associated pointers;
assigning a deletion timestamp to a node each time it is split or deleted;
beginning a search for a given element including establishing a search timestamp to provide an indication of the time t which the search began; and
comparing a deletion timestamp of a node to the search timestamp before examining the node for the given element.

37. A method as claimed in claim 36 further comprising the step of storing the most recently assigned deletion timestamps and respective nodes in a cache memory.

38. A method as claimed in claim 37 wherein the step of storing includes removing the least recent timestamp and respective node from the cache memory to provide room for an incoming timestamp and respective node when the cache memory is full.

39. A method as claimed in claim 38 wherein the step of comparing includes, for a node absent from the cache memory, comparing the search timestamp to a last removed deletion timestamp of the cache memory.

40. A method as claimed in claim 37 wherein the step of storing includes removing the least likely to be used deletion timestamp and respective node from the cache memory to provide room for an incoming deletion timestamp and respective node when the cache memory is full.

41. A method as claimed in claim 40 wherein the step of comparing includes, for a node absent from the cache memory, comparing the search timestamp to a previously removed deletion timestamp of the cache memory having the most recent deletion timestamp of all previously removed deletion timestamps of the cache memory.

* * * * *